US 11,169,264 B2

(12) United States Patent
Crew et al.

(10) Patent No.: US 11,169,264 B2
(45) Date of Patent: Nov. 9, 2021

(54) PERSONAL SONAR SYSTEM

(71) Applicant: Bose Corporation, Framingham, MA (US)

(72) Inventors: John Edward Crew, Acton, MA (US); Oleg Panteleev, Framingham, MA (US)

(73) Assignee: Bose Corporation, Framingham, MA (US)

( * ) Notice: Subject to any disclaimer, the term of this patent is extended or adjusted under 35 U.S.C. 154(b) by 89 days.

(21) Appl. No.: 16/555,661

(22) Filed: Aug. 29, 2019

(65) Prior Publication Data
US 2021/0063569 A1  Mar. 4, 2021

(51) Int. Cl.
*G09B 21/00* (2006.01)
*G01S 15/00* (2020.01)
*G01S 15/52* (2006.01)
*G01S 7/524* (2006.01)
*G01S 7/526* (2006.01)
G01C 19/02 (2006.01)
G01S 15/88 (2006.01)

(52) U.S. Cl.
CPC ............ *G01S 15/523* (2013.01); *G01S 7/524* (2013.01); *G01S 7/526* (2013.01); *G01C 19/02* (2013.01); *G01S 15/88* (2013.01)

(58) Field of Classification Search
CPC ........ G01S 15/523; G01S 7/524; G01S 7/526; G01S 15/88; G01S 15/8927; G01S 15/8981; G01S 17/48; G01S 17/66; G01S 17/42; G01C 19/02; G01C 19/065
See application file for complete search history.

(56) References Cited

U.S. PATENT DOCUMENTS

| | | | | |
|---|---|---|---|---|
| 2,434,644 A | * | 1/1948 | Fairweather | G01S 1/72 367/127 |
| 3,178,711 A | * | 4/1965 | Case, Jr. | G01S 13/9092 342/98 |
| 4,310,903 A | * | 1/1982 | Kay | G09B 21/007 367/102 |
| 4,528,563 A | * | 7/1985 | Takeuchi | G01S 15/931 180/169 |
| 4,774,515 A | * | 9/1988 | Gehring | G01S 5/0247 342/53 |
| 5,432,755 A | * | 7/1995 | Komninos | G01H 3/12 367/135 |

(Continued)

*Primary Examiner* — Hai Phan
*Assistant Examiner* — Son M Tang
(74) *Attorney, Agent, or Firm* — Hoffman Warnick LLC

(57) ABSTRACT

Various implementations include a personal sonar system sized to be worn on a body of a user. In some cases, the system includes: at least one acoustic transmitter for transmitting ultrasonic signals into an environment proximate the user; at least two acoustic receivers for receiving return ultrasonic signals from the environment proximate the user; a directional indication system for providing a directional output to the user; and a controller coupled with the at least one transmitter, the at least two acoustic receivers, and the directional indication system, the controller configured to: identify a physical object within the environment proximate the user based on the return ultrasonic signals; and initiate the directional output at the directional indication system based on the identified physical object within the environment.

15 Claims, 11 Drawing Sheets

(56) References Cited

U.S. PATENT DOCUMENTS

| | | | | |
|---|---|---|---|---|
| 5,724,313 | A * | 3/1998 | Burgess | A61H 3/061 367/102 |
| 5,818,381 | A * | 10/1998 | Williams | A61H 3/061 342/24 |
| 5,982,286 | A * | 11/1999 | Vanmoor | G01S 15/04 340/573.4 |
| 6,160,479 | A * | 12/2000 | åhlen et al. | G01C 3/10 340/555 |
| 9,824,677 | B2 * | 11/2017 | Kwatra | G10K 11/17881 |
| 10,262,044 | B2 * | 4/2019 | Bostick | G06Q 10/109 |
| 10,341,775 | B2 * | 7/2019 | Vilermo | H04S 7/304 |
| 10,506,838 | B2 * | 12/2019 | Tammam | A42B 3/046 |
| 10,535,280 | B2 * | 1/2020 | Kohn | G09B 21/006 |
| 10,638,248 | B1 * | 4/2020 | Dodds | G10K 11/17813 |
| 10,807,230 | B2 * | 10/2020 | Szatmary | B25J 9/1674 |
| 2002/0067271 | A1 * | 6/2002 | Depta | A61F 9/08 340/573.1 |
| 2005/0265123 | A1 * | 12/2005 | Pope | G01S 7/64 367/99 |
| 2009/0220124 | A1 * | 9/2009 | Siegel | G06K 9/00342 382/103 |
| 2009/0231595 | A1 * | 9/2009 | Petroff | A63F 13/213 356/614 |
| 2009/0278684 | A1 * | 11/2009 | Petricoin, Jr. | G06K 9/209 340/557 |
| 2010/0262009 | A1 * | 10/2010 | Lynch | G01S 7/52036 600/455 |
| 2011/0090093 | A1 * | 4/2011 | Grimm | G08G 1/162 340/901 |
| 2014/0251396 | A1 * | 9/2014 | Subhashrao | A61H 3/068 135/66 |
| 2014/0287806 | A1 * | 9/2014 | Balachandreswaran | A63F 13/212 463/7 |
| 2015/0054794 | A1 * | 2/2015 | Li | G06F 3/043 345/177 |
| 2015/0161872 | A1 * | 6/2015 | Beaulieu | G01S 13/06 340/686.6 |
| 2015/0172878 | A1 * | 6/2015 | Luna | H04W 4/12 455/412.2 |
| 2016/0119732 | A1 * | 4/2016 | Voix | H04R 3/007 381/58 |
| 2016/0154089 | A1 * | 6/2016 | Altman | G08B 13/1618 367/124 |
| 2016/0203689 | A1 * | 7/2016 | Hintz | G08B 13/19695 348/155 |
| 2016/0208537 | A1 * | 7/2016 | Senguttuvan | E05F 15/73 |
| 2017/0140746 | A1 * | 5/2017 | Gether | G10K 11/17875 |
| 2017/0263107 | A1 * | 9/2017 | Doyle | G08B 25/016 |
| 2018/0003817 | A1 * | 1/2018 | Wenus | G01S 15/878 |
| 2018/0078444 | A1 * | 3/2018 | Gamerman | A61H 3/061 |
| 2018/0293979 | A1 * | 10/2018 | Liu | G10L 25/84 |
| 2018/0301012 | A1 * | 10/2018 | Carlson | G08B 21/02 |
| 2019/0116414 | A1 * | 4/2019 | Mallinson | H03F 3/45475 |
| 2019/0268550 | A1 * | 8/2019 | Arnold | A42B 3/0433 |
| 2020/0184057 | A1 * | 6/2020 | Mukund | H04R 1/08 |
| 2020/0236466 | A1 * | 7/2020 | Zhao | H04R 5/033 |

* cited by examiner

PERSONAL SONAR SYSTEM

TECHNICAL FIELD

This disclosure generally relates to object detection. More particularly, the disclosure relates to body-worn systems for ultrasonic-based object detection.

BACKGROUND

Conventional devices for aiding the visually impaired have numerous shortcomings. These devices can be unwieldy, and additionally, may not provide sufficient information about a user's surroundings to allow that user to move freely within an environment.

SUMMARY

All examples and features mentioned below can be combined in any technically possible way.

Various implementations include personal sonar systems sized to be worn on the body of a user. The personal sonar systems are configured to identify a physical object within the environment proximate the user, and initiate a directional output to the user based upon the identified physical object.

In some particular aspects, the personal sonar system includes: at least one acoustic transmitter for transmitting ultrasonic signals into an environment proximate the user; at least two acoustic receivers for receiving return ultrasonic signals from the environment proximate the user; a directional indication system for providing a directional output to the user; and a controller coupled with the at least one transmitter, the at least two acoustic receivers, and the directional indication system, the controller configured to: identify a physical object within the environment proximate the user based on the return ultrasonic signals; and initiate the directional output at the directional indication system based on the identified physical object within the environment.

In other particular aspects, a personal object detection system is disclosed. In these cases, the personal object detection system includes: at least one object detection sensor for detecting an object in an environment proximate a user; a directional indication system for providing a directional output to the user; and a controller coupled with the object detection sensor and the directional indication system, the controller configured to: identify a physical object within the environment proximate the user based on object detection data from the object detection sensor; and initiate the directional output at the directional indication system based on the identified physical object within the environment.

Implementations may include one of the following features, or any combination thereof.

In certain aspects, the controller identifies the physical object within the environment by: triangulating a plurality of locations of the physical object using the return ultrasonic signals originating from the same acoustic transmitter and transmitted at the same time; and identifying the physical object within the environment at an intersection of the plurality of locations.

In some cases, the controller is configured to adjust for a difference between the ultrasonic signals transmitted by the at least one acoustic transmitter and the return ultrasonic signals based on known spacings between the at least two receivers and each of the at least two receivers and the transmitter.

In particular aspects, the controller is configured to instruct the acoustic transmitter to transmit the ultrasonic signals into the environment in a search pattern.

In certain implementations, the system further includes at least one position sensor for detecting a change in position of the body of the user, where the at least one position sensor includes at least one of: a one-axis sensor, a two-axis sensor, a gyroscopic sensor, or an electrolytic sensor.

In particular aspects, the system further includes at least one motion sensor for detecting user motion.

In some cases, the system further includes a mounting plate for mounting on the body of the user, the mounting plate coupled with the controller, the directional indication system, and the at least two acoustic receivers.

In particular implementations, the at least one acoustic transmitter includes two acoustic transmitters, and the at least two acoustic receivers are located between the two acoustic transmitters.

In certain aspects, the directional indication system includes at least two transducers, and initiating the directional output includes initiating spatialized audio output at the least two transducers based on the identified physical object within the environment.

In some implementations, the controller includes a noise management module for filtering ambient acoustic signals while providing the spatialized audio output.

In particular cases, the at least two transducers include an array of speakers for providing the spatialized audio output based on the identified physical object within the environment.

In some aspects, the controller is connected with an audio gateway and is configured to mix audio from the audio gateway with the spatialized audio for output at the at least two transducers.

In some cases, the audio from the audio gateway includes navigation instructions from a navigation application, and the spatialized audio includes speech indicating the physical object within the environment.

In particular implementations, the controller further identifies a location of the physical object within the environment, and the spatialized audio output indicates a direction of the physical object relative to the body of the user.

In certain cases, the spatialized audio output indicates the direction of the physical object with a variation in at least one of: volume of audio output, frequency of audio output, or repeat rate of sound in the audio output (e.g., an alert such as a beep, bell, buzz, etc.).

In particular aspects, the directional indication system includes a haptic feedback device, and initiating the directional output includes initiating a haptic response at the haptic feedback device based on the identified physical object within the environment.

In certain implementations, the haptic feedback device includes a vibro-tactile device, and the haptic response indicates a direction of the physical object relative to the body of the user.

In some aspects, the at least one acoustic transmitter and one of the at least two acoustic receivers are part of a transceiver unit.

In particular cases, at least one of the at least two receivers has a face that is at least partially angled relative to a movement direction of the user for detecting ground elevation.

In certain implementations, the controller is configured to initiate transmitting the ultrasonic signals into the environment with unique acoustic signatures, e.g., differentiated by at least one of pulse duration, pulse repetition, pulse pattern or wave shape.

In particular cases, the system further includes an interface for receiving user commands, where the interface provides a plurality of user-selectable operating modes including at least one of: a sweep mode configured to provide a spatialized directional representation of the environment proximate the user with a progressive sweep over a predetermined span of directional orientations; or a close object mode configured to provide a spatialized directional representation of physical objects located within a threshold distance from the user as detected by the return ultrasonic signals.

In certain aspects, the directional indication system includes at least two transducers for providing spatialized audio output and a haptic feedback device for initiating a spatialized haptic response.

In some implementations, the system further includes at least one microphone coupled with the controller and configured to detect ambient acoustic signals, where the controller is configured to initiate the directional output as a spatialized haptic response in response to the at least one microphone indicating an ambient sound pressure level (SPL) meets or exceeds a threshold SPL for a spatialized audio output.

In particular cases, the controller includes an orientation program for detecting an orientation of the system relative to true north.

In certain implementations, the at least two acoustic receivers comprise X receivers separated from a direct neighboring receiver by a distance of Y, where X is an integer and Y is greater than approximately 1.25 centimeters.

In some aspects, the at least one acoustic transmitter and the at least two acoustic receivers are arranged in a linear array.

In particular implementations, the at least one acoustic transmitter and the at least two acoustic receivers are arranged in a two-dimensional array.

In certain cases, the system further includes a power source coupled with the controller.

In some implementations, the controller is configured to disregard return ultrasonic signals that are only detected by a single one of the at least two receivers.

In particular aspects, the controller is configured to triangulate a location of the physical object based on a known location of the at least one acoustic transmitter and the at least two acoustic receivers.

In certain cases, the system further includes an interface permitting the user to adjust: at least one of a frequency, a transmit power or a waveform of the transmitted ultrasonic signals; and a sensitivity of the at least one acoustic receiver to return ultrasonic signals.

In particular aspects, the controller is configured to: automatically tune the transmitted ultrasonic signals to select a frequency, transmit power, pulse length, number of pulses, pulse pattern or a waveform that provides the highest signal-to-noise ratio (SNR) based on the received return ultrasonic signals; and automatically adjust the sensitivity of the at least one acoustic receiver based on the identified physical object within the environment.

In some implementations, the one axis sensor includes two distinct front-to-back tilt sensors configured to mount proximate to a shoulder region on the body of the user. In additional aspects, the one axis sensor includes at least one side-to-side tilt sensor for determining orientation of the chest plate.

In certain cases, the mounting plate is shaped to mount on the front of the body of the user such that the transmitter is positioned to transmit the ultrasonic signals in a forward direction relative to the user.

In particular implementations, the mounting plate further includes a cover for creating a water resistant seal around the controller, the at least one acoustic transmitter, the at least two acoustic receivers and the directional indication system.

In certain cases, the at least two transducers includes two pairs of transducers, each pair having an upper transducer and a lower transducer, where the controller is configured to initialize the spatialized audio output at the pairs of transducers to indicate a height of the identified physical object relative to the user within the environment.

In particular implementations, the noise management module is configured to mix the ambient acoustic signals with the spatialized audio output for playback at the transducers.

In some aspects, the sweep mode presents the user with indicators about physical objects in the environment proximate the user at a varying rate, sound type or frequency based on proximity to the physical objects.

In certain implementations, the sensor(s) include one or more of: a) a two-axis sensor (e.g., including a conductive ball, mercury, or another conductive material rolling inside a chamber with multiple electrical contacts); b) a single-axis sensor (e.g., including a conductive ball, mercury, or another conductive material inside a chamber with a multiple electrical contacts; c) a gyroscopic sensor; or d) an electrolytic sensor (e.g., including a fluid that conducts electricity, which can include multiple electrical probes at distinct heights).

In some cases, the system includes at least one additional sensor for detecting at least one characteristic of an object, such as: a range of the object, a direction of the object relative to the system, a motion characteristic of the object (e.g., direction of motion, speed, acceleration), or an identity of the object.

In particular aspects, the at least one additional sensor includes at least one of: a stereo optical sensor, an infrared sensor, a camera system, a LIDAR system, a RADAR system, a global positioning system (GPS), or a set of microphones.

In various implementations, the stereo optical sensor is configured to detect the presence of an object, and may be used to estimate range to an object, or motion of an object. The infrared sensor is configured to detect motion of an object and presence of an object. The camera system is configured to detect motion of an object, presence of an object, and/or identity of an object. The LIDAR system and the RADAR system are each configured to detect object range and/or object motion. The GPS is configured to detect user location and motion. The set of microphones is configured to identify objects by a corresponding acoustic signature.

Two or more features described in this disclosure, including those described in this summary section, may be combined to form implementations not specifically described herein.

The details of one or more implementations are set forth in the accompanying drawings and the description below. Other features, objects and benefits will be apparent from the description and drawings, and from the claims.

Figure 1:
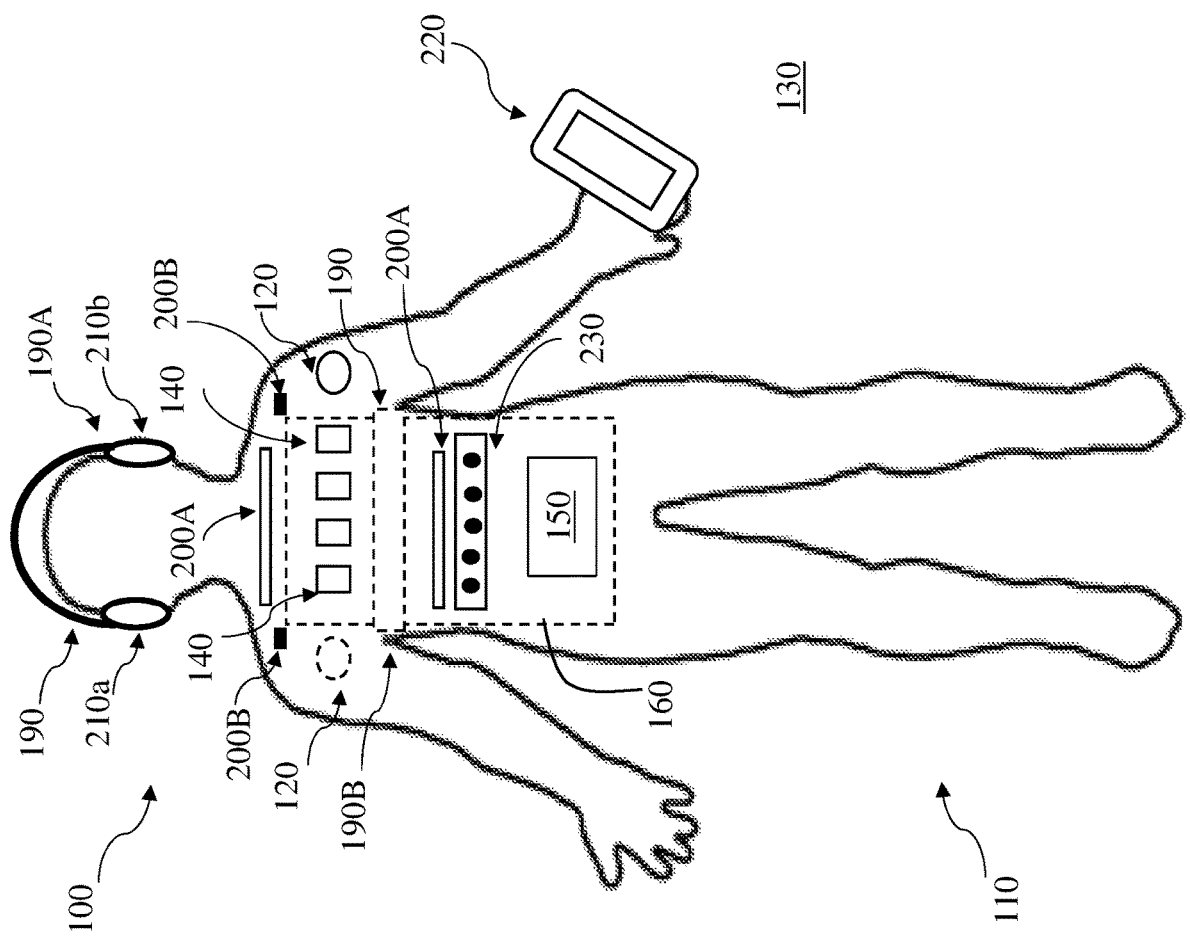
FIG. 1 is a schematic front view of an example personal sonar system worn by a user according to various implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that an acoustic-based detection system can be beneficially deployed as an aid for the visually impaired. For example, a personal sonar system can provide a user (e.g., a visually impaired user) with a directional indicator about one or more physical objects in a surrounding environment. The systems disclosed according to various implementations provide the user with a more complete understanding of the environment as compared with conventional systems for aiding the visually impaired.

Commonly labeled components in the FIGURES are considered to be substantially equivalent components for the purposes of illustration, and redundant discussion of those components is omitted for clarity.

FIG. 1 is a schematic illustration of a personal sonar system 100 worn by a (human) user 110 according to various implementations. In some cases, the personal sonar system 100 includes at least one acoustic transmitter 120 for transmitting ultrasonic signals into an environment 130 proximate the user 110. In various implementations, the acoustic transmitter 120 can include a speaker system or other acoustic transducer configured (e.g., programmed) to transmit signals in the ultrasonic frequency range. In a particular implementation depicted in FIG. 1, the personal sonar system 100 is shown including two acoustic transmitters 120, with an optional second one of the transmitters 120 depicted in phantom. It is understood that in various implementations, the personal sonar system 100 can include three, four, five or more acoustic transmitters 120 mounted in any position within the system 100. In some implementations, the range of the personal sonar system 100 can be up to approximately 5-10 meters. In various implementations, the frequency range of the ultrasonic signal is approximately: 35 kilo-Hertz (kHz) to approximately 80 kHz.

The personal sonar system 100 can also include at least two acoustic receivers 140 for receiving return ultrasonic signals from the environment 130 proximate the user 110. Each receiver 140 can include one or more microphones for detecting ultrasonic signals from the environment 130, e.g., ultrasonic signals that are returned by interference with one or more physical objects after being sent by the transmitter(s) 120. In various implementations, more than two receivers 140 are arranged in the system 100, e.g., three, four or more receivers 140 can be used to detect the return ultrasonic signals. In particular cases, the receivers 140 are separated from a direct neighboring receiver 140 by a distance that is greater than approximately 1.25 centimeters (approximately 0.5 inches).

In some particular implementations, for example, where the system 100 includes multiple transmitters 120, one or more of the receivers 140 is positioned between adjacent transmitters 120. In the example shown in FIG. 1, the transmitters 120 and receivers 140 are arranged in a linear array, and the receivers 140 are located between transmitters 120. It is understood that the system 100 can function as described herein with only two receivers 140, as the known position of the two receivers 140 can be used to detect directionality of the return ultrasonic signals. In certain implementations, one or more of the transmitter(s) 120 and one or more of the receivers 140 are part of a transceiver unit (i.e., having a combined transmitter and receiver in a single unit).

Figure 2:
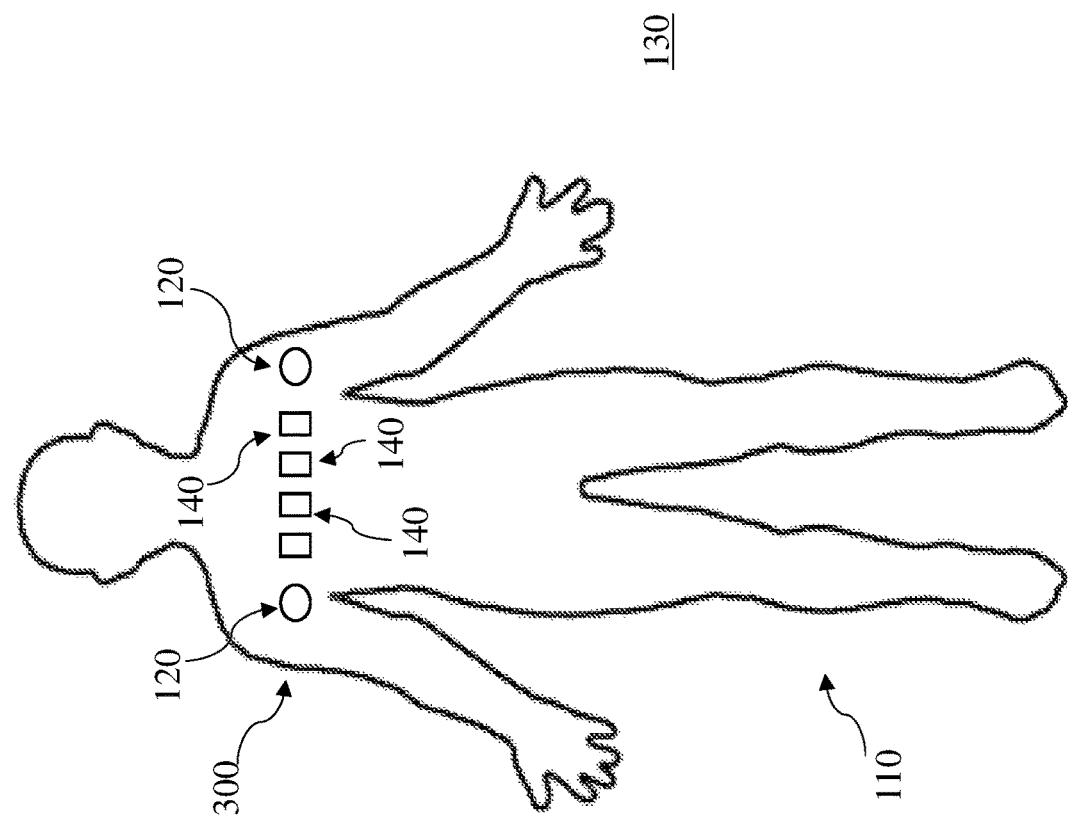
FIG. 2 depicts one example array of transmitters and receivers in a personal sonar system according to various implementations.
Figure 3:
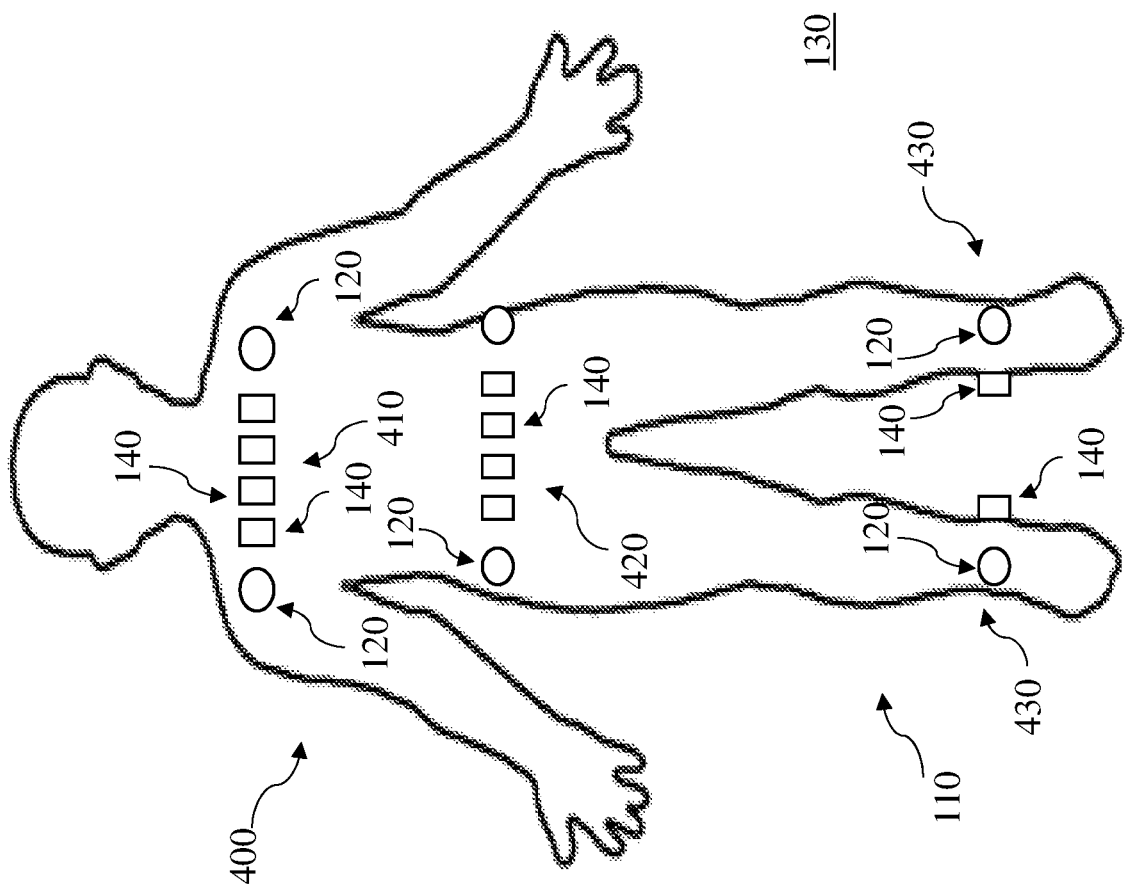
FIG. 3 depicts an additional example array of transmitters and receivers in a personal sonar system according to various implementations.
Figure 4:
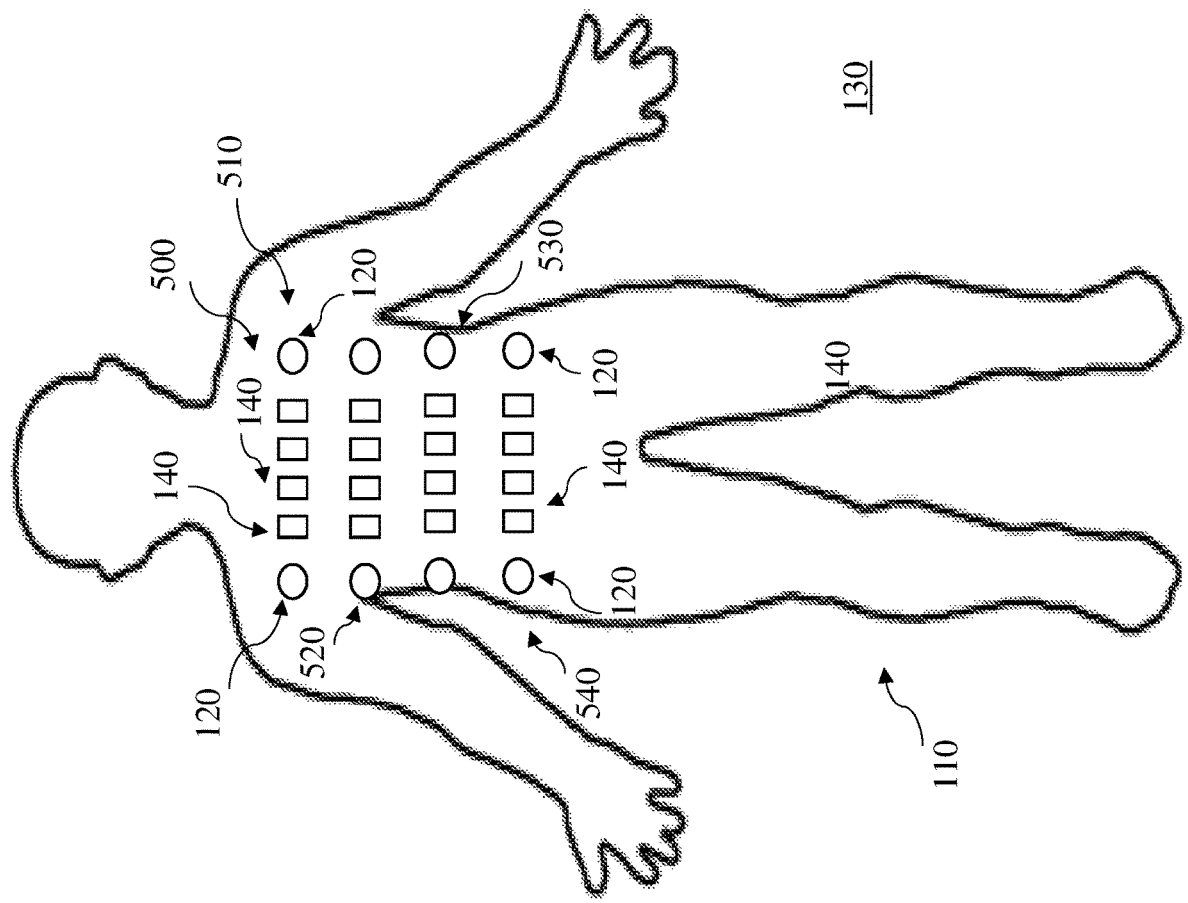
FIG. 4 depicts a further example array of transmitters and receivers in a personal sonar system according to various implementations.

FIGS. 2-4 illustrate example variations on transmitter 120 and receiver 140 arrangements according to various implementations. FIG. 2 illustrates one sensor array 300 including two transmitters 120 arranged in a linear array with a set of receivers 140, in this case, four receivers 140. The linear array 300 is located proximate the chest and shoulder area of the user 110, such that the transmitters 120 and receivers 140 are positioned to detect physical objects that are approximately at the height of the user's chest and shoulders. In additional implementations, the transmitters 120 and/or receivers 140 are aligned at an angle relative to the mounting plate 160, e.g., angled upward or downward relative to the face of the mounting plate 160. In these implementations, the transmitters 120 and receivers 140 can be configured detect objects above and/or below the height of the user's chest and shoulders. Additionally, the relative angle of the transmitters 120 and receivers 140 will dictate the height above or below which objects can be detected. In various implementations, the detection height above or below the horizontal plane at which objects can be detected is defined by: sin(detection angle limit/2)*distance. For example, where the transmitters 120 and receivers 140 have a detection angle limit equal to five (5) degrees, at 10 meters from the transmitter(s) 120, the receivers 140 can detect objects at a height above or below the plane of the transmitters/receivers of approximately 0.44 meters.

FIG. 3 depicts an additional sensor array 400 including sub-arrays 410, 420, 430. In these cases, sub-array 410 is positioned proximate the user's chest and shoulder region, sub-array 420 is positioned proximate the user's waist, and sub-arrays 430 are positioned proximate the user's calf and ankle region. In some cases, sub-arrays 410 and 420 can be similar to array 300 in FIG. 2 (e.g., linear array with transmitters 120 outside of receivers 140). Sub-arrays 430 can each include a transmitter 120 and receiver 140, e.g., where receivers 140 are located proximate the inner leg of the user 110 and transmitters 120 are located proximate the front of the user's leg.

FIG. 4 depicts an additional two-dimensional array 500, which can include a plurality of sub-arrays 510, 520, 530, 540, each of which can be similar in configuration to array 300 in FIG. 2. These sub-arrays 510-540 can be positioned at different vertical heights along the user's body, e.g., from the shoulder-chest region, to the waist region. Each sub-array 510-540 can be configured to detect physical objects at distinct heights.

Figure 5:
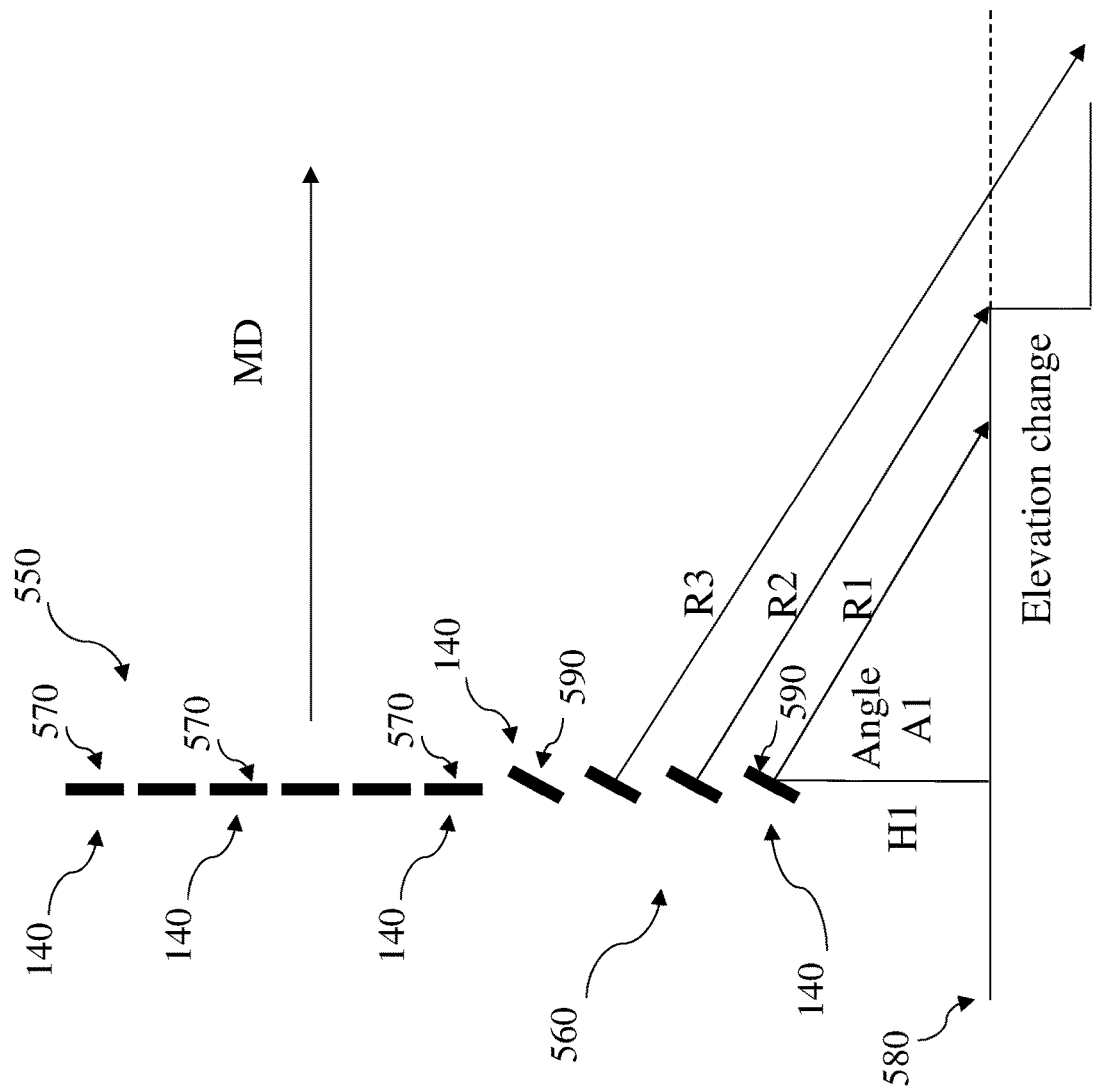
FIG. 5 shows a schematic side-cross-sectional view of a set of receivers in a personal sonar system according to various implementations.
Figure 6:
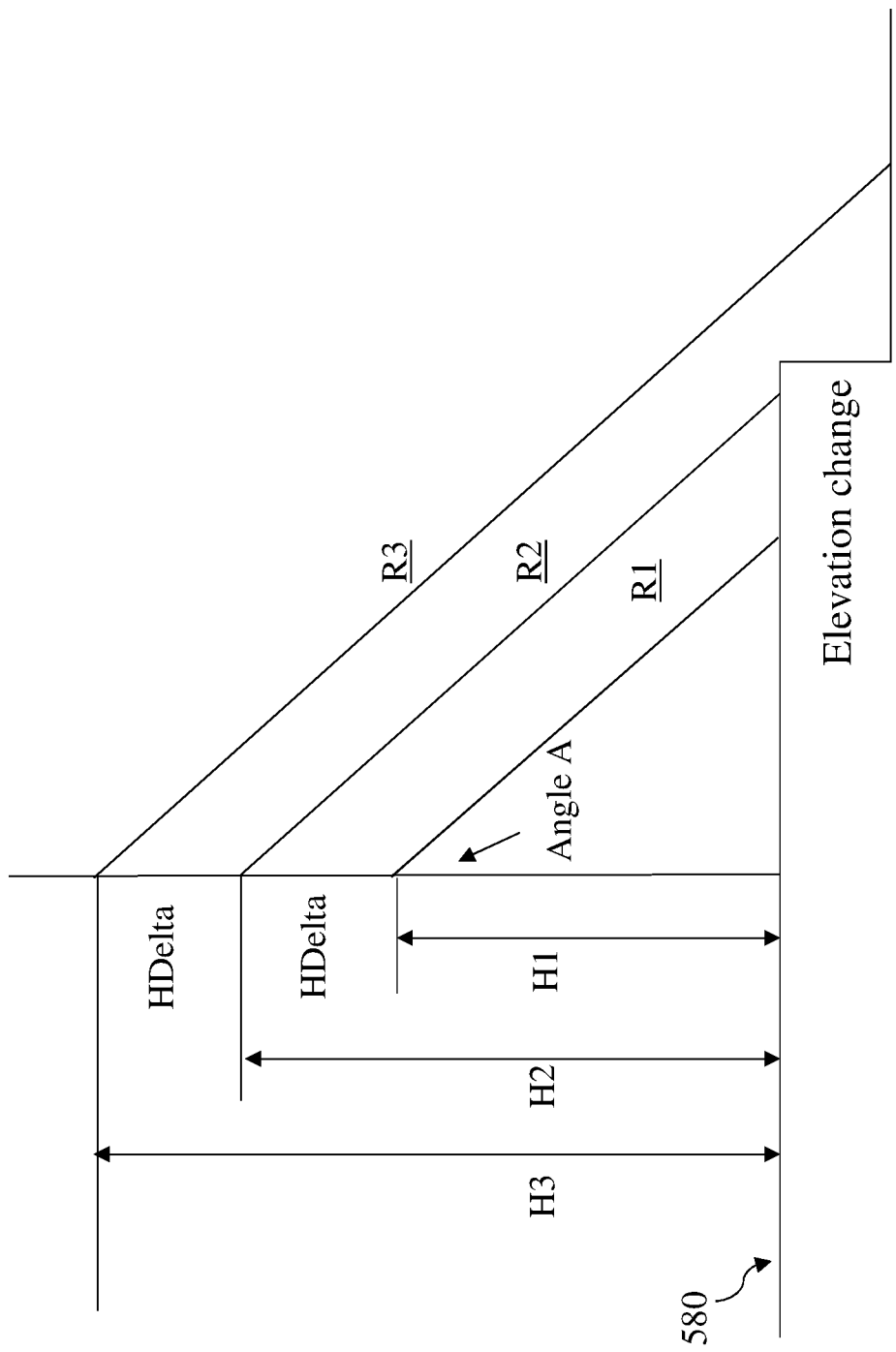
FIG. 6 shows a general mathematical model for detecting changes in elevation in the surface depicted in FIG. 5.

FIG. 5 shows a schematic side-cross-sectional view of a set of receivers 140 (or, transceivers) in sub-arrays 550 and 560 aligned vertically, where the receivers 140 in the first sub-array 550 have a face 570 that is normal to the movement direction of the user (MD), such that the face 570 of the receivers 140 in the first sub-array 550 is directed approximately parallel with the surface 580 (e.g., ground) upon which the user is travelling (e.g., walking). The second sub-array 560 of receivers 140 each have a face 590 that is at least partially angled relative to a movement direction (MD) of the user for detecting ground elevation, e.g., changes in the relative elevation of the surface 580 upon which the user is travelling. Sub-array 560 can be configured to detect changes in ground elevation, such as steps up or down, and other topographical changes. FIG. 6 shows a general mathematical model for detecting changes in elevation in the surface 580, as performed by the controller that is described further herein. In this case, heights from the surface 580 (e.g., ground or floor) are indicated by: H1, H2, and H3. The range to the surface 580 (e.g., ground or floor) from each receiver 140 is indicated by: R1, R2, R3. In this depiction, where the surface 580 is approximately flat, the following equation holds true:

$$\cos(\text{Angle } A) = H1/R1 = H2/R2 \quad \text{(equation 1)}$$

$$\cos(\text{Angle } A) != H3/R3 \quad \text{(equation 2)}$$

Where the entirety of the surface 580 is flat, heights and ranges of neighboring receivers 140 should be proportional, however, where a step or other elevation change is introduced as shown in FIGS. 5 and 6, this proportionality does not hold true because R3 is a greater value than expected in a proportional scenario:

$$(H2/H1) = (R2/R1) \quad \text{(equation 3)}$$

$$(H3/H2) != (R3/R2) \quad \text{(equation 4)}$$

Figure 7:
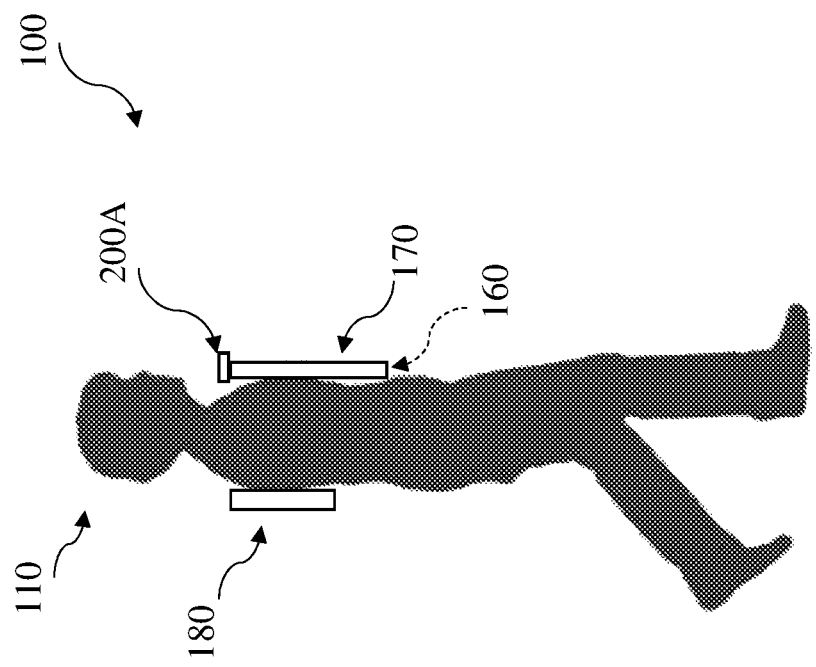
FIG. 7 is a schematic side view of a personal sonar system worn by a user according to various implementations.
Figure 8:
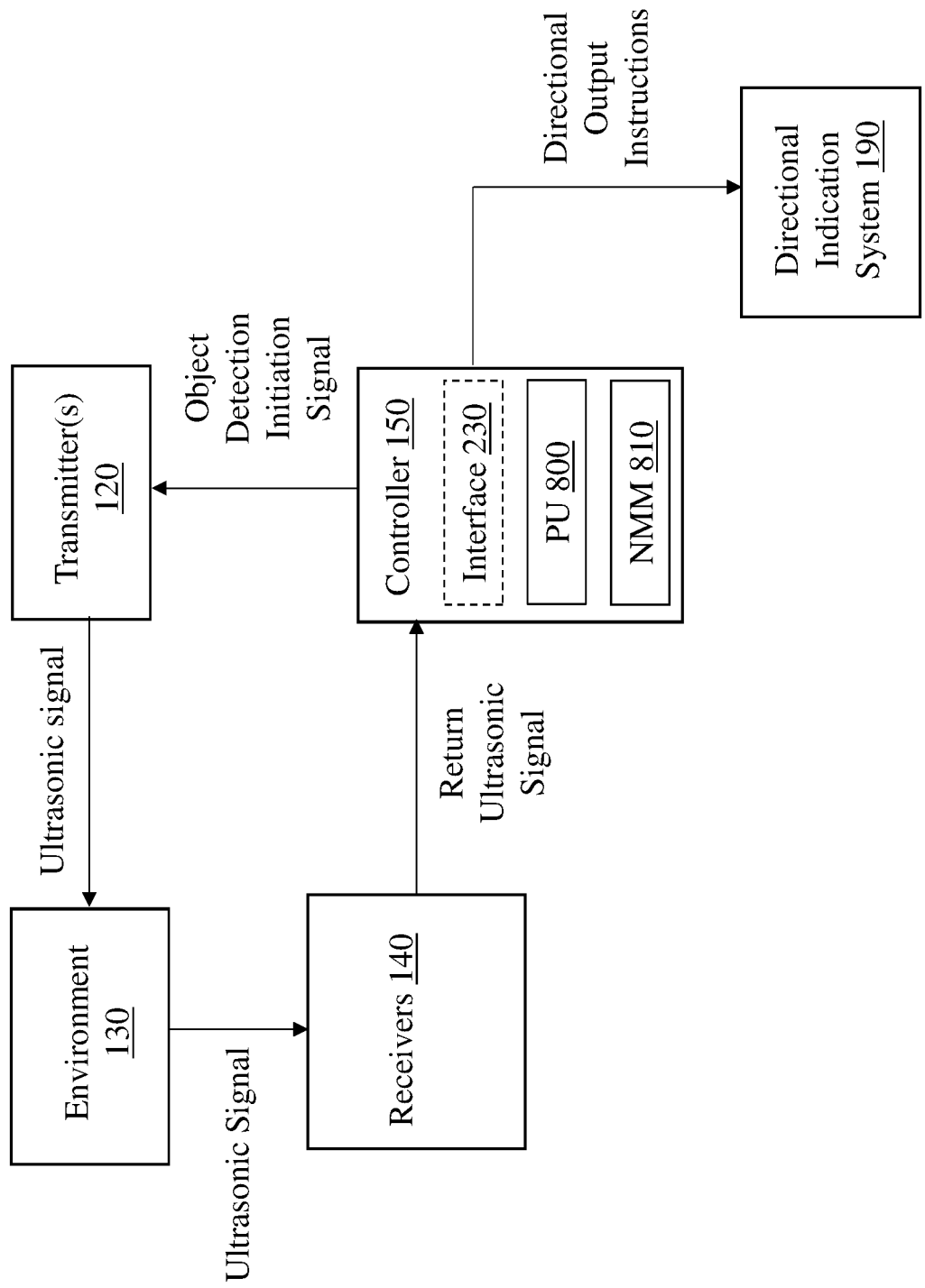
FIG. 8 is a schematic data flow diagram illustrating control functions performed by a personal sonar system according to various implementations.

Returning to FIG. 1, system 100 can also include a controller 150 coupled with the transmitter(s) 120 and receivers 140. The controller 150 can include a processor (PU) 800 (FIG. 8) that is configured to perform various functions described herein. In certain cases, the transmitter(s) 120, receivers 140, and controller 150 can be mounted or otherwise coupled to a mounting plate 160 for mounting on the body of the user 110. One embodiment of the mounting plate 160 is also illustrated in one example side view of system 100 in FIG. 7. In some cases, the mounting plate 160 is shaped to mount on the front of the body of the user 110, such that the transmitter 120 is positioned to transmit the ultrasonic signals in a forward direction relative to the user 110. The mounting plate 160 can be worn over the chest-and-shoulder area of the user 110 in some cases. However, in other cases, the mounting plate 160 is at least partially worn as a belt around the waist/torso region of the user 110. In certain cases, the mounting plate 160 is connected with one or more straps, hooks, fasteners or clips for attaching to the user's clothing or wrapping around one or more body parts of the user 110. The mounting plate 160 is rigid in some cases, and is formed of a metal, plastic and/or composite material. In other cases, the mounting plate 160 is flexible, such that it conforms to the shape of the user's body. In particular cases, the mounting plate 160 includes a cover 170 (FIG. 7) for creating a water resistant seal around transmitter(s) 120, receivers 140, controller 150 and other system components connected to the mounting plate 160. In additional implementations, as depicted in FIG. 7, the system 100 can include additional electronics 180 including but not limited to a power source, processors, memory, communications components such as transmitters/receivers, network connection equipment (including but not limited to: Wi-Fi, Bluetooth, cellular or near field communications (NFC) equipment) and location-identification components (e.g., GPS systems). In a particular implementation depicted in FIG. 7, the additional electronics 180 can be contained or otherwise grouped in a separate housing (e.g., as in an over-the-shoulder backpack or pouch) from the mounting plate 160 and cover 170. In other cases, the additional electronics 180 are physically housed with the mounting plate 160, e.g., within the cover 170.

Returning to FIG. 1, the controller 150 can be coupled with a directional indication system 190 that is configured to provide a directional output to the user 110 based upon a detected direction (and in some cases, location or proximity) of a physical object within the environment 130 (e.g., within a proximity such as several meters around the user 110). Additional aspects of the control processes are depicted in the data flow diagram in FIG. 8, which is referred to simultaneously with FIG. 1. In various implementations, the controller 150 is configured to: a) identify the physical object within the environment 130 based upon the return ultrasonic signals detected by the receivers 140; and b) initiate a directional output at the directional indication system 190 based upon the identified physical object within the environment 130.

As part of process (a) noted above, the controller 150 is configured to identify a location of the physical object within the environment 130 based upon the return ultrasonic signals detected by the receivers 140. In particular, the controller 150 is configured to: (i) triangulate a plurality of locations of the physical object using the return ultrasonic signals originating from the same acoustic transmitter 120 and transmitted at the same time; and (ii) identify the physical object within the environment 130 at an intersection of the plurality of locations. As noted herein, depending upon the number of transmitters 120 and receivers 140 used for object detection in the system 100, these locations can fall along one or more ellipsoids (or other arcs). For example, for a known time of travel and a specific receiver 140, the possible location of an object is somewhere on an ellipsoidal surface with the transmitter 120 and receiver 140 as the foci. The controller 150 is configured to identify the intersection of the ellipsoidal surfaces for all receivers 140. In these cases, with two receivers 140, the possible object location is somewhere on the arc defined by the intersection of two ellipsoidal surfaces. With three or more receivers 140, the possible location can be even more accurately determined because that location is at the intersection of multiple ellipsoidal surfaces, e.g., at one or two points in space. The controller 150 is configured to calculate a likely location for the object based upon return ultrasonic signals detected by two or more receivers 140, e.g., within a range defined by the measurement error of the transmitters/receivers.

In certain cases, the controller 150 is configured to disregard return ultrasonic signals that are only detected by a single one of the at least two receivers 140. That is, the controller 150 does not use return ultrasonic signals that are detected by only one of the receivers 140 in detecting the presence of an object in the environment 130. These ultrasonic signals may not provide sufficiently reliable information about the location of the physical object, and as such, can be disregarded. In various implementations, where the return ultrasonic signals are detected at two or more receivers 140, the controller 150 is configured to triangulate a location of the physical object based upon a known location of the transmitter(s) 120 and the (two or more) receivers 140.

In particular cases, the controller 150 is configured to adjust a difference between the ultrasonic signals based on known spacing(s) between the receivers 140, as well as spacing(s) between the receivers 140 and the transmitter(s) 120. That is, the reflected ultrasonic signals will necessarily have different travel times to the different locations in the system 100, and the controller 150 adjusts for those distinct locations to determine whether a physical object is present in the detection range. For a given receiver 140, the possible locations of an object fall anywhere along an ellipsoid. With two or more receivers 140, the controller 150 in system 100 triangulates an object's location using total signal travel time and the known position of the receivers 140. In certain cases, using only two receivers 140 enables the controller 150 to calculate the distance to an object based upon the return ultrasonic signals, but may not enable calculation of the object's height (e.g., relative to the ground and/or to the user 110). Where the system includes a third receiver 140, the controller 150 can determine height, distance and direction of the object relative to the user based upon the return ultrasonic signals (e.g., providing a three-dimensional reference point for the object). In particular cases, the system 100 includes three or more receivers 140 to enable accurate detection of objects as well as differentiation of signals (e.g., where significant echoes are present).

In some cases, the controller 150 instructs the transmitter(s) 120 to transmit ultrasonic signals into the environment 130 in a search pattern, e.g., in a sweeping pattern from left-to-right, right-to-left, center-outward, up/down, down/up, near-to-far, far-to-near and/or any other directional and/or depth-related pattern. In particular cases, the search pattern sweeps directionally (e.g., left-to-right, center-out) and at progressively greater range (e.g., distance X, followed by distance 2X, followed by distance 3X) in order to provide information about physical objects that the user 110 is approaching, or objects that are approaching the user 110. In certain implementations, the controller 150 adjusts the frequency and/or range (e.g., sweep angles and/or depth) of the sweep, or in some cases, other audio characteristics of the sweep (e.g., transmitted power, pulse length, number of pulses, or waveform) based upon detected movement of the user 110 (e.g., as detected by a position sensor, and/or a motion sensor). In these cases, the controller 150 is configured to increase the frequency of the sweep in response to detecting an increase in the user's pace (e.g., movement forward), and decrease the frequency of the sweep in response to detecting a decrease in the user's pace. In implementations where system 100 has a plurality of transmitters 120 and receivers 140, the controller 150 can select distinct subsets of transmitters 120 and receivers 140 for object detection based upon the current speed and movement direction of the user 110. For example, the controller 150 can increase the detection range of the transmitters 120 and receivers 140 in response to detecting an increase in the speed of the user 110, and decrease the corresponding detection range in response to detecting a decrease in the speed of the user 110. Additionally, the controller 150 can adjust object detection patterns based upon the speed and direction in which the user 110 is moving. In certain implementations, the controller 150 includes an orientation program for detecting an orientation of the system 100 relative to true north, e.g., to provide a reference point for each sweep.

As described further herein, while in sweep mode, the controller 150 is configured to present the user 110 with indicators about physical objects in the environment proximate the user 110 across the sweep range. In some cases, these indicators are presented at a varying rate, sound type (e.g., beep, buzz, bell, etc.) or frequency based upon the proximity of the physical objects. For example, the controller 150 can initiate a higher frequency pulse (e.g., vibration) and/or a pulse with longer displacement at a haptic-based directional indication system or a higher frequency sound (and/or higher volume sound) at an audio-based directional indication system when an object is detected as being closer to the user 110, as compared with a lower frequency pulse (vibration) and/or shorter displacement pulse or lower frequency sound (and/or lower volume sound) for an object that is detected as being farther from the user 110.

In additional implementations, the controller 150 is configured to initiate transmission of the ultrasonic signals into the environment 130 at unique acoustic signatures. That is, the controller 150 instructs the transmitter(s) 120 to transmit ultrasonic signals into the environment 130 with a combination of audio characteristics that together create a unique acoustic signature, which can aid in detecting one or more physical objects (and help improve signal-to-noise ratio, or SNR) based on the unique characteristics of the return signal(s). In these cases, the unique acoustic signatures can differ from one another, e.g., in pulse duration, pulse repetition, pulse pattern and/or wave shape). The receivers 140 are configured to convey not only that a return ultrasonic signal is received, but also a characteristic of the signature received, such that the controller 150 can determine which signature(s) are received at the receivers 140 at different times, e.g., where waveform of type A is transmitted at time t=0 and detected at time t=X and waveform of type B is transmitted at time t=1 and detected at time t=1+2X. In these cases, the controller 150 is configured to differentiate signals detected at a first receiver 140 (and transmitted from a corresponding transmitter 120) from those signals detected at another receiver 140 (and transmitted from a corresponding distinct transmitter 120) using the acoustic signature(s) of the detected signal(s).

In a particular example, the controller 150 is configured to receive a plurality of return ultrasonic signals at the receivers 140, and determine the following: (i) which transmitter 120 sent the received signal; (ii) the time that the transmitter 120 sent the received signal; and (iii) which receiver(s) 140 detected the signal. The controller 150 is further configured to: (iv) compute the total travel time of the signal to each receiver 140; (v) compute the distance the signal traveled to and from the object back to the receiver 140; and (vi) compare the computed distances for each of a plurality of return ultrasonic signals to locate the object. The controller 150 is configured to coordinate transmitting a unique combination of ultrasonic signatures in the transmitted signals, e.g., by varying frequency, number of pulses and/or waveform for each transmitter 120 (e.g., and for each broadcast). These unique combinations are stored at the controller 150 for comparison with the return ultrasonic signals, such that the controller 150 is configured to match the received ultrasonic signals with the corresponding transmitter 120 and time of transmission.

In certain implementations, the system 100 further includes at least one position sensor 200 for detecting changes in position of the body of the user 110. In particular cases, the position sensor 200 can include one or more of: a one-axis sensor, a two-axis sensor, a gyroscopic sensor or an electrolytic sensor. In certain aspects, the controller 150 is additionally coupled with a motion sensor such as an inertial measurement unit (IMU), accelerometer/gyroscope/magnetometer, optical tracking system, geolocation system, etc. located on another user-worn device such as a wearable smart device or a smart device carried by the user 110 (e.g., smart phone or audio gateway). In some cases, the controller 150 is configured to measure the user's acceleration and direction with data from the position sensor(s) 200 and motion sensor(s), and compute the user's current acceleration, speed, position, and direction of motion. In some cases, the motion sensor(s) (e.g., accelerometer(s)) periodically compute the current speed and direction of the system 100 and send this motion data to the controller 150. In certain implementations, the motion sensor periodically computes the current speed and movement direction of the system using multiple acceleration measurements.

In some cases, the system 100 includes a plurality of position sensors 200 for detecting the relative position of portions of the user's body. In one particular example illustrated in FIG. 1, the position sensors 200 include two types of position sensor 200A, 200B. Position sensors 200A can include front-to-back tilt sensors that are configured to detect forward/backward angle of the user's torso (e.g., at the shoulder region). In one particular implementation, the system 100 includes two distinct front-to-back tilt sensors configured to mount proximate the shoulder region of the user's body. In implementations that include additional position sensors 200, position sensors 200B can include horizontal tilt sensors that are configured to detect relative angle of the user's upper torso and lower torso. In particular cases, the controller 150 receives this position data (e.g., about tilt) from the position sensors 200 and adjusts the detected difference in ultrasonic signals based upon the relative position of the transmitter(s) 120 and receivers 140, for example, where the user 110 is turned left or right, or leaning forward or backward.

In one particular case, the directional indication system 190 includes an audio device 190A with at least two transducers 210a, 210b, illustrated as a personal audio device in FIG. 1. It is understood that when implemented as an audio device, the directional indication system 190 can include any personal audio device with two or more transducers 210 that are controllable to provide a spatialized audio output, such as a portable speaker, headphones, and wearable audio devices in various form factors, such as watches, glasses, neck-worn speakers, helmets with integrated speakers, shoulder-worn speakers, body-worn speakers, etc.

In particular implementations, the controller 150 is configured to initiate a spatialized audio output at the transducers 210a, 210b based upon the identified physical object, e.g., such that the source of audio output at the transducers 210a, 210b appears to originate from the direction in which the physical object is identified (relative to the body of the user 110). In certain implementations where the directional indication system 190 includes the audio device 190A, the spatialized audio output indicates the direction of the physical object with a variation in one or more of: a volume of the audio output, a frequency of the audio output, a repeat rate of a sound in the audio output (e.g., beep, bell, buzz, etc.).

In some cases, the controller 150 includes a noise management module (NMM 810, FIG. 8) that is configured to filter ambient acoustic signals while providing the spatialized audio output (at audio device 190A). In these implementations, the controller 150 including the noise management module 810 can include an active noise reduction (ANR) and/or controllable noise cancelling (CNC) module for filtering ambient acoustic signals while playing back the spatialized audio output. In particular cases, the noise management module 810 is configured to detect ambient acoustic signals proximate to the user 110, and based upon a frequency and/or SPL of those signals, adjust a noise cancelling function at the audio device 190A to either increase the SPL of the ambient acoustic signals to the user 110 (e.g., where the frequency is detected as matching an alarm or other high-importance alert), or decrease the SPL of the ambient acoustic signals to the user 110 (e.g., where the frequency is detected as matching background noise). In additional implementations, the noise management module 810 is configured to mix the ambient acoustic signals with the spatialized audio output for playback at the audio device 190A.

While the audio device 190A illustrated in FIG. 1 is shown as a personal audio device, it is understood that in various additional implementations, the audio device 190A includes a speaker system, where transducers 210A, 210B are part of an array of speakers for providing the spatialized audio output to the user 110 based on the identified physical object within the environment. In these cases, the array of speakers can be located on the mounting plate 160, e.g., across the user's chest area.

In some particular implementations, each of the transducers 210A, 210B includes a pair of transducers (four total), such that each pair of transducers has an upper transducer and a lower transducer. In these cases, the controller 150 is configured to initialize the spatialized audio output at the pairs of transducers to indicate a height of the identified physical object relative to the user 110 in the environment. In these cases, the controller 150 can indicate both direction and height of the identified physical object to the user 110 with a spatialized audio output.

In still further implementations, as illustrated in the example in FIG. 1, the controller 150 is connected with an audio gateway 220 and is configured to mix audio from the audio gateway 220 with the spatialized audio for output at the at least two transducers 210A, 210B. In particular implementations, the audio gateway 220 is a smart device such as a smart phone, smart watch, or wearable smart device (e.g., having communications and processing capabilities commonly found in smart phones). In some cases, the audio gateway 220 allows for playback of audio such as music, podcasts, navigation instructions, video audio, and phone call audio. In various implementations, the controller 150 is configured to mix audio from the audio gateway 220 (e.g., phone call audio, or music playback) with the spatialized audio for playback at the transducers 210A, 210B. In these cases, the user 110 can receive spatialized audio indicators about nearby physical objects while conducting a phone call, listening to music or navigating an unfamiliar area.

In particular cases, the audio gateway audio includes navigation instructions from a navigation application. In these cases, the controller 150 is configured to output the spatialized audio (at transducers 210A, 210b) as speech indicating the physical object within the environment, e.g., mixing the spatialized audio speech with the navigation instructions. For example, the controller 150 can interrupt the navigation instructions, pause navigation instructions or adjust (e.g., lower) the volume of the playback of navigation instructions at the transducers 210A, 210B and interject spatialized speech indicating the physical object within the environment (e.g., after pausing navigation instructions, or mixing with navigation instructions, outputting the following from a direction at the user's front-left side: "watch for obstruction ahead on your left").

In some additional cases, the directional indication system 190 includes a haptic feedback device 190B (illustrated in phantom) that is configured to initiate a haptic response based upon the identified physical object within the environment 130. In certain cases, the haptic feedback device 190B includes a vibro-tactile device, and the haptic response indicates a direction of the physical object relative to the body of the user 110. In certain cases, the vibro-tactile device includes a set of speakers or transducers for creating a vibration across one or more portions of the user's body. In various implementations, the controller 150 is configured to vary the intensity (i.e., volume) of the vibration for each vibro-tactile device, e.g., individually or in sets such as pairs. In these cases, initiating the directional output includes initiating a haptic response at the haptic feedback device 190B based on the identified physical object within the environment 130. For example, the haptic feedback device 190B can be integrated in the mounting plate 160. In these cases, the haptic feedback device 190B can include one or more vibro-tactile devices configured to initiate vibration at distinct locations on the mounting plate 160 (or on a separate mounting belt or other mount), e.g., with vibro-tactile devices proximate each corner of the mounting plate 160, along the sides of the mounting plate 160 and/or proximate a central area of the mounting plate 160. In these cases, the vibro-tactile devices can be actuated to indicate the presence of a physical object in both horizontal and vertical directions. In particular, the controller 150 is configured to send a signal to one or more of the vibro-tactile devices based upon the detected location of the physical object, e.g., to actuate a subset of the vibro-tactile devices to indicate the direction of that physical object relative to the user 110.

In additional cases, the haptic feedback device 190B is integrated in a wearable device e.g., a smart device such as a smart watch, smart belt, head, shoulder or other body-worn smart device, or a personal audio device. In particular cases, the haptic feedback device 190B is integrated into the audio device 190A, such that the audio device 190A includes one or more vibro-tactile devices configured to be actuated by the controller 150. In these cases, the directional indication system 190 can include one or both of the audio device 190A and the haptic feedback device 190B. According to some implementations, the controller 150 is configured to initiate directional indicators at both the audio device 190A and the haptic feedback device 190B based upon user-defined settings and/or detected ambient acoustic signals (e.g., via a microphone(s) at the audio device 190A or another connected smart device). For example, the controller 150 can be configured to provide haptic feedback about the location of a detected object in response to detecting ambient acoustic signals that have an SPL that meets or exceeds a threshold.

The high SPL of the acoustic signals can indicate that the user 110 is in a noisy environment, and may benefit more from a vibro-tactile cue. In still other cases, the controller 150 can be configured to provide haptic feedback about the location of a detected object in response to detecting that the user's paired audio gateway 220 is engaged in a phone call (e.g., call audio is being sent/received by the audio device 190A), or that another software application engaging audio is active (e.g., navigation application with audio instructions). In these cases, the controller 150 is configured to detect application activity at one or more devices (e.g., audio gateway 220), and in response to detecting application activity that engages audio, initiate haptic feedback about the location of a detected object.

Returning to FIG. 1, in various implementations, the system 100 can further include an interface 230 for receiving user commands. In some cases, the interface 230 includes a plurality of user-selectable operating modes, which can include at least one of a sweep mode or a close object mode. In sweep mode, as described herein, the controller 150 is configured to provide a spatialized directional representation of the environment 130 proximate the user 110 with a progressive sweep over a predetermined span of directional orientation. In this mode, the controller 150 instructs the transmitter(s) 120 to send ultrasonic signals in a progressive manner across a span of directional orientations (e.g., −30 degrees to +30 degrees from straight ahead). In close object mode, the controller 150 is configured to provide a spatialized directional representation of physical objects located within a threshold distance from the user 110 as detected by the return ultrasonic signals (detected at receivers 140). In this mode, the controller 150 listens for a shorter period for return ultrasonic signals (echoes) than in sweep mode, and is configured to provide the directional output in response to detecting return ultrasonic signals (via receivers 140) indicating that a physical object is within a "close range" distance, e.g., two, three or four meters away.

In various implementations, the interface 230 allows the user 110 to adjust: a frequency, transmit power or a waveform of the transmitted ultrasonic signals, as well as a sensitivity of the acoustic receiver to return ultrasonic signals. The interface 230 can include one or more conventional inputs, such as haptic inputs including a dial, button, touch screen, etc. The interface 230 can also include a voice command interface, such that the user 110 can make adjustments using voice commands. The interface 230 can also include a gesture-based interface, such that the user 110 can make adjustments with gestures (e.g., hand wave, nodding, etc.).

The controller 150 can be configured to perform additional processes in identifying physical objects within the environment 130 proximate to the user 110. For example, in particular implementations, the controller 150 is configured to perform an auto-tune process in order to enhance detection of physical objects in the environment 130. In some cases, the controller 150 is configured to automatically tune the transmitted ultrasonic signals to select an acoustic signal characteristic (e.g., frequency, transmit power, pulse length, number of pulses, pulse pattern or a waveform) that provides the highest signal-to-noise ratio (SNR) based on the received return ultrasonic signals. That is, the controller can be configured to receive a set of return ultrasonic signals (via receiver 140), and based upon the SNR of those received ultrasonic signals, select the acoustic signal characteristic(s) (e.g., frequency/frequencies, power, pulse length, pulse number, pulse pattern or waveform(s)) corresponding with the highest SNR (e.g., a top 10 percent of SNR, or an SNR that is above a threshold). In various implementations, the controller can select a new acoustic signal characteristic (e.g., number of pulses, pulse pattern, waveform, etc.) based on one or more of: a) measured acoustic characteristics such as SNR, b) detection of one or more other devices operating at the same frequency but with a different additional signal characteristic (e.g., pulse rate or waveform), or c) another detection error indicating a deviation from an expected signal response.

Additionally, the controller 150 is configured to automatically adjust the sensitivity of the receivers 140 based on the identified physical object within the environment 130. In these cases, the controller 150 adjusts the sensitivity of the receivers 140 in response to detecting an excessively powerful received ultrasonic signal (e.g., indicating that the user 110 is close to a large object such as a wall), or in response to detecting little or no return ultrasonic signal activity (e.g., where the transmitted ultrasonic signals are not returned to the receivers 140 such as when the user 110 is in an open, unobstructed space). In particular implementations, the controller 150 reduces the sensitivity of the receivers 140 in response to detecting greater than a threshold range of return ultrasonic signal activity, and in response to detecting less than the threshold range of return ultrasonic signal activity, increases the sensitivity of the receivers 140.

Figure 9:
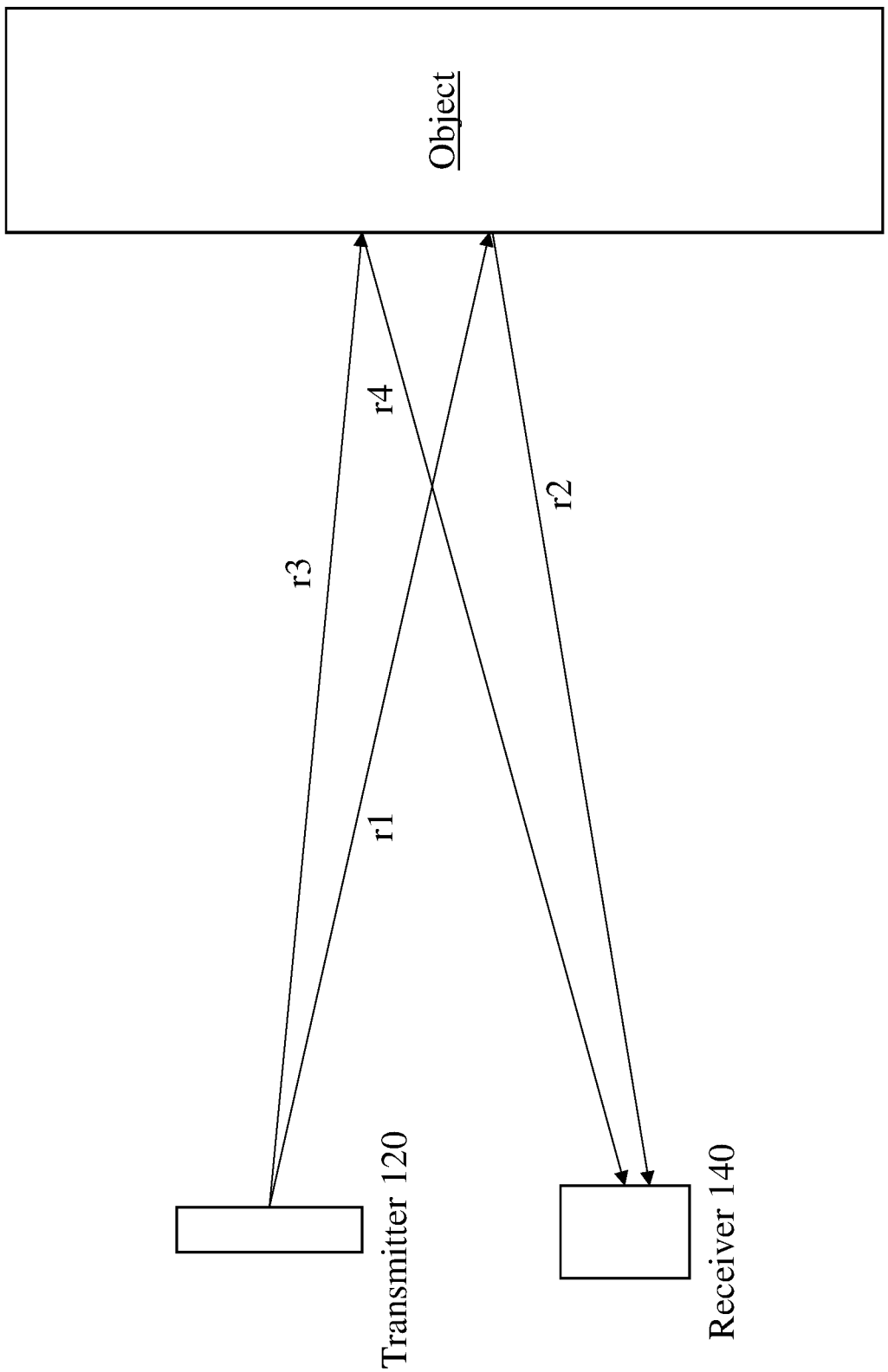
FIG. 9 is an example signal path diagram illustrating processes in multipath interference detection in an environment according to various implementations.

FIG. 9 is an example signal path diagram illustrating additional aspects of the controller 150 in accounting for multipath interference. In some cases, the controller 150 is configured to adjust for multipath interference rejection using modes such as receiver selection and/or response selection. In some cases, the controller 150 is configured to select ultrasonic signals received at one or more particular receiver(s) 140 that have a narrow field of view relative to the transmitter(s) 120. In these cases, the controller 150 will reject ultrasonic signals received at a receiver 140 that is separated from the corresponding transmitter 120 by a distance equal to or greater than a threshold value. As such, the controller 150 only uses ultrasonic signal data from transmitter(s) 120 that are within a defined spacing from the receiver 140, and thus have less opportunity to cause signal interference. In additional implementations, the controller 150 is configured to accept only the first response from a transmitter 120, where multiple ultrasonic signals are received from that transmitter 120 within a period (e.g., within a matter of seconds). These processes can reduce multipath signal interference. In example cases, the controller 150 is configured to ignore or otherwise discount echoes by: (i) for each receiver 140, only storing the first detection (e.g., detection time) of a unique acoustic signature, such as a unique combination of frequency, number of pulses and/or waveforms; and (ii) only recording the detections (e.g., detection times) for signals above a volume threshold. This approach can help reduce the impact of secondary echoes in object detection, for example, because these secondary echoes are likely to be delayed relative to primary object detection signals and are likely to be weaker than such signals.

Figure 10:
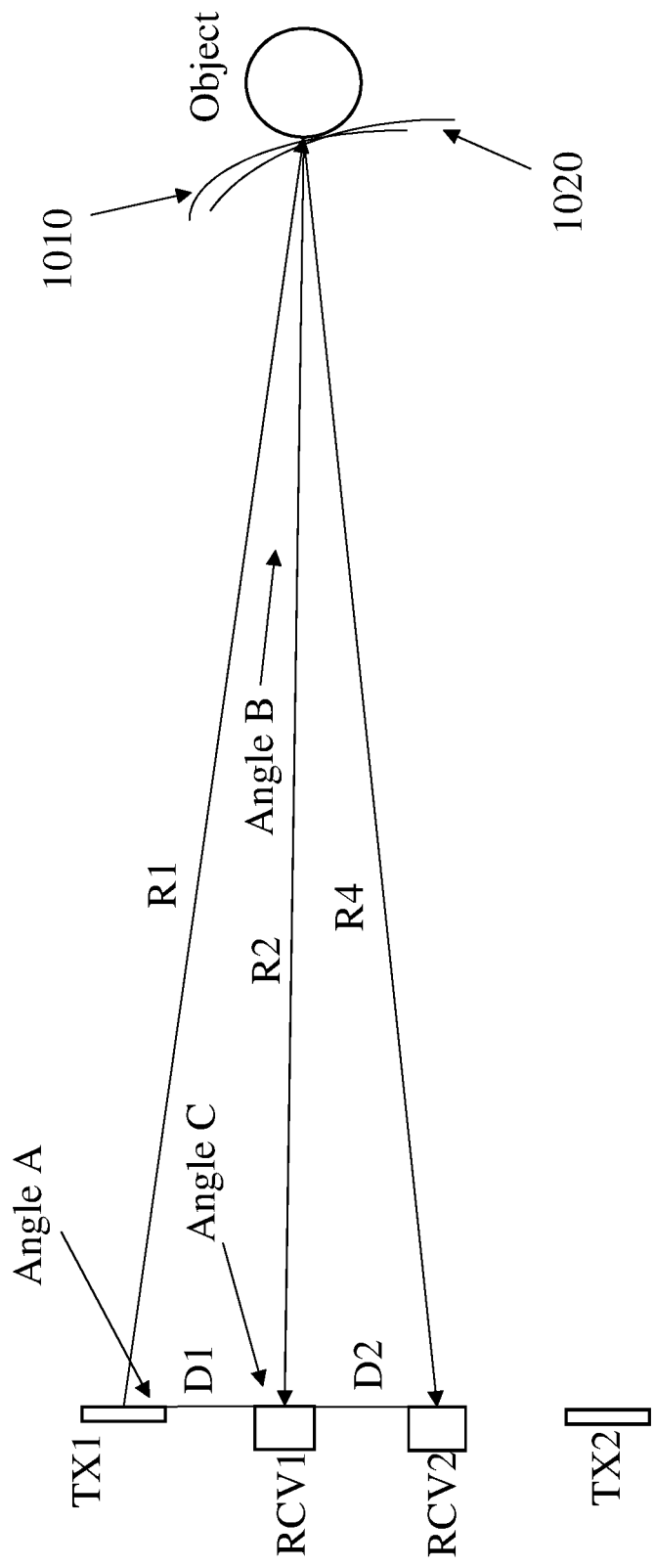
FIG. 10 is an additional example signal path diagram illustrating processes in object triangulation in an environment according to various implementations.

FIG. 10 is an example signal path diagram illustrating additional aspects of the controller 150 in calculating object location using two-dimensional (2D) triangulation. As illustrated in FIG. 10, dimensions D1 and D2 between neighboring transmitters (TX) and receivers (RCV) are known. Quantities R1+R2 and R3+R4 are measured in detecting the Object, where R3 is part of the path from TX1 to RCV2. The angles between paths R1, R2 and R4 are not known with sufficient precision to use a law of sines or cosines approach. In these cases, the controller 150 calculates the location of the Object using elliptical arcs 1010, 1020 with a fixed distance (R1+R2, and R3+R4). Where TX1 and RCV1 are the foci of ellipse 1010, and TX1 and RCV2 are the foci of ellipse 1020, the controller detects the Object as located at the intersection of these two ellipses 1010, 1020. In additional implementations, which can supplement the ellipse-based calculation noted above, the controller 150 is also configured to determine a general location for the Object using the known field of view of the receivers RCV1, RCV2. In these examples, for each measurement, the controller 150 determines the total travel time for the sound. As noted herein, if only locating an object in two dimensions, the location of the Object that causes an echo can be anywhere along an elliptical arc with the foci as the transmitter and receiver. In embodiments with two different receivers that receive echo signals from the same transmitted signal, the controller 150 is configured to calculate where the two elliptical arcs intersect. In these cases, the controller 150 is configured to determine the location of the object in two dimensions. Additionally, the controller 150 can increase the confidence value in its object detection using a known angle of the beam from the transmitter and the detected reception angle at the receiver. Based upon this angle data, the controller 150 can locate the object along a narrower range of locations on the elliptical arc.

Figure 11:
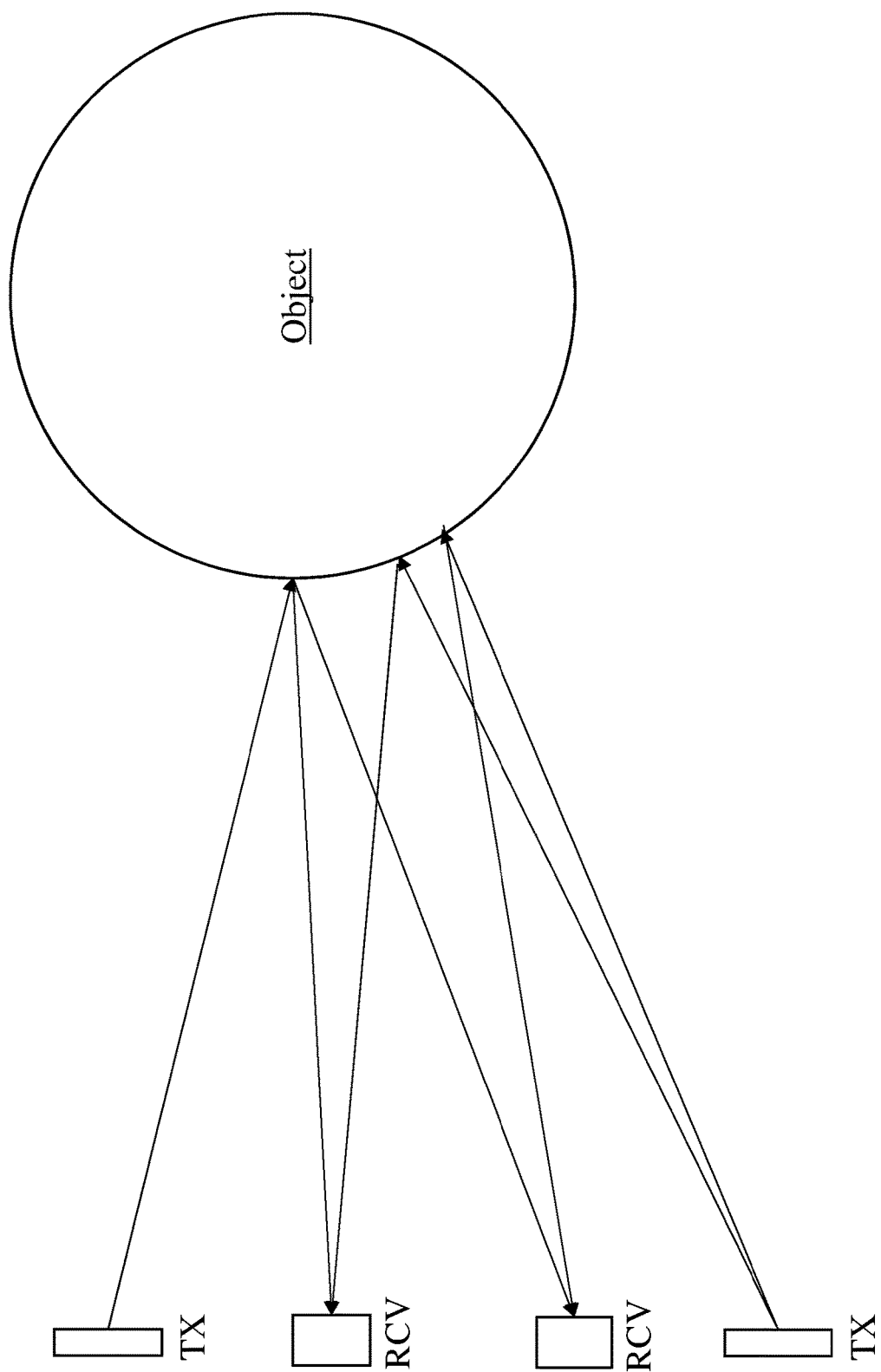
FIG. 11 is another example signal path diagram illustrating processes in echo signal differentiation in an environment according to various implementations.

FIG. 11 is an example signal path diagram illustrating additional aspects of the controller 150 in calculating object location with multiple transmitters (TX) and multiple receivers (RCV). In these cases, and as described further herein, the controller 150 instructs the transmitters (TX) to send signals with distinct signatures, for example, distinct waveforms (e.g., sine, sawtooth, etc.), distinct pulse characteristics (e.g., number of pulses, pulse duration, pulse pattern) or distinct frequencies to transmit ultrasonic signals at different times. This approach allows the receivers (RCV) to identify which transmitter (TX) sent each signal, and at which time. In other cases, the controller 150 instructs the transmitters (TX) to send signals with the same signature, but institutes a delay between each successive signal until echoes from the previous signal set dissipate. In various implementations, the transmitters (TX) are directional transmitters with a limited field of view, which can aid the controller 150 in determining the direction from which return ultrasonic signals are received at the receivers (RCV). In additional implementations, receivers (RCV) are chosen that have a relatively small receiving aperture for improving directional determination. Additionally, the controller 150 is configured to match results of detected signals at multiple receivers (RCV) in order to improve accuracy. In some cases, as noted herein, the system 100 can include two or more receivers (RCV) for detecting the presence of objects. However, in various additional implementations, the system 100 includes three or more receivers that are configured to triangulate the location of objects in three dimensions. In particular cases, the system 100 includes three or more receivers for triangulating the location of an object within a volume, where the minimum size of the volume is defined as being greater than the three-dimensional measurement error of the transmitter/receivers. The shape of the volume can include any of a sphere, a square box, a rectangular box, a cone, etc. In these cases, the controller 150 is configured to define the volume as a boundary containing the most triangulated location estimates, which is the most likely location of the object.

In particular implementations, the system 100 (including controller 150) is configured to detect moving objects (e.g., cars, people, animals, etc.) in addition to stationary objects (e.g., walls, poles, buildings, curbs, etc.). In these cases, the system 100 is configured to provide collision warnings and other information to the user 110 about relative movement of nearby objects. In these cases, the controller 100 is configured to: (1) maintain a history of the user's speed, acceleration, direction and current location; (2) maintain a history of detected object locations; (3) match (i.e., identify) detected objects with their past location; (4) determine the direction, speed, and acceleration of moving objects; (5) extrapolate (e.g., estimate) a future position of the moving objects; (6) extrapolate (e.g., estimate) a future position of the user; and (7) provide a spatialized indication about the object location to the user where the future positions in processes (5) and (6) are within a threshold distance of one another. In various implementations, the threshold distance is a fixed distance (e.g., two meters+/−a measurement error). In other implementations, the controller 150 dynamically calculates the threshold distance based upon the detected speed of the user and the object, as well as the extrapolated position of the user and the object.

In some additional implementations, the system 100 includes at least one additional sensor for detecting at least one characteristic of an object, such as: a range of the object relative to the system 100, a direction of the object relative to the system 100, a motion characteristic of the object 100 (e.g., direction of motion, speed, acceleration), or an identity of the object 100. In particular aspects, the additional sensor is an object detection sensor including at least one of: a stereo optical sensor, an infrared sensor, a camera system, a light detection and ranging (LIDAR) system, a radio detection and ranging (RADAR) system, a global positioning system (GPS), or a set of microphones. In particular implementations, the stereo optical sensor is configured to detect the presence of an object, and can estimate object range and direction. In certain cases, the infrared sensor is configured to detect motion of an object and presence of an object. In some aspects, the camera system is configured to detect motion of an object, presence of an object, and/or identity of an object. In particular implementations, the LIDAR system and the RADAR system are each configured to detect object range and/or object motion. In certain cases, the GPS is configured to detect user location and motion. In some aspects, the set of microphones is configured to identify objects by a corresponding acoustic signature.

In certain additional implementations, the object detection sensor supplements the acoustic transmitter(s) 120 and receivers 140 in system 100, for example, to verify characteristics of an object detected using ultrasonic approaches. In these cases, the controller 150 is configured to select the object detection sensor to confirm object characteristics such as location, motion or identity based upon environmental conditions, or to resolve measurement inaccuracies and/or ambiguities detected by the acoustic transmitter(s) 120 and receivers 140. In other additional implementations, the object detection sensor can replace the ultrasonic object detection system in system 100. In these implementations, the controller 150 works in concert with the object detection sensor to detect the presence of an object in the environment 130. The controller 150 then sends a directional indicator (via directional indication system 190) to the user 110 about the location of the detected object, as described herein. In these cases, the object detection sensor can be mounted similarly as the acoustic transmitter(s) 120 and receivers 140 in system 100, e.g., on the mounting plate 160. In other cases, the object detection sensor can be mounted on another body-worn system on the user 110.

In contrast to conventional systems for assisting the visually impaired, the systems described according to various implementations are configured to provide the user with spatialized feedback about the surrounding environment. This depth of information allows the visually impaired user to more easily navigate unfamiliar and/or dynamic environments when compared with the basic feedback provided by conventional systems.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

Additionally, actions associated with implementing all or part of the functions described herein can be performed by one or more networked computing devices. Networked computing devices can be connected over a network, e.g., one or more wired and/or wireless networks such as a local area network (LAN), wide area network (WAN), personal area network (PAN), Internet-connected devices and/or networks and/or a cloud-based computing (e.g., cloud-based servers).

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other implementations are within the scope of the following claims.

We claim:

1. A personal sonar system sized to be worn on a body of a user, the system comprising:
   at least one acoustic transmitter for transmitting ultrasonic signals into an environment proximate the user;
   at least two acoustic receivers for receiving return ultrasonic signals from the environment proximate the user;
   a directional indication system for providing a directional output to the user, wherein the directional indication system comprises at least two transducers; and
   a controller coupled with the at least one transmitter, the at least two acoustic receivers, and the directional indication system, the controller configured to:
      identify a physical object within the environment proximate the user based on the return ultrasonic signals, wherein controller identifies the physical object within the environment by:
         triangulating a plurality of locations of the physical object using the return ultrasonic signals originating from the same acoustic transmitter and transmitted at the same time; and
         identifying the physical object within the environment at an intersection of the plurality of locations,
      wherein the controller is configured to adjust for a difference between the ultrasonic signals transmitted by the at least one acoustic transmitter and the return ultrasonic signals based on known spacings between the at least two receivers and each of the at least two receivers and the transmitter; and
      initiate the directional output at the directional indication system based on the identified physical object within the environment, wherein initiating the directional output comprises initiating spatialized audio output at the least two transducers based on the identified physical object within the environment,
   wherein the controller comprises a noise management module for filtering ambient acoustic signals while providing the spatialized audio output, wherein the noise management module is configured to:
      increase a sound pressure level (SPL) of the ambient acoustic signals in response to a detected frequency of the ambient acoustic signals corresponding with an alarm or other high-importance alert; and
      decrease the SPL of the ambient acoustic signals in response to the detected frequency of the ambient acoustic signals corresponding with background noise.

2. The system of claim 1, wherein the controller is configured to instruct the acoustic transmitter to transmit the ultrasonic signals into the environment in a search pattern, and wherein the controller is further configured to:
   for each of the receivers, store only a first detection of a unique acoustic signature in the return ultrasonic signals; and
   record only detections of return ultrasonic signals that satisfy a volume threshold.

3. The system of claim 1, further comprising:
   at least one position sensor for detecting a position change of the body of the user, wherein the at least one position sensor comprises at least one of: a one-axis sensor, a two-axis sensor, a gyroscopic sensor, or an electrolytic sensor; and
   a motion sensor for detecting movement of the user.

4. The system of claim 1, further comprising a mounting plate for mounting on the body of the user, the mounting plate coupled with the controller, the directional indication system, and the at least two acoustic receivers.

5. The system of claim 1, wherein the at least one acoustic transmitter comprises two acoustic transmitters, and wherein the at least two acoustic receivers are located between the two acoustic transmitters.

6. The system of claim 1, wherein the at least two transducers comprise an array of speakers for providing the spatialized audio output based on the identified physical object within the environment, wherein the array of speakers is located on a mounting plate.

7. The system of claim 6, wherein the controller is connected with an audio gateway and is configured to mix audio from the audio gateway with the spatialized audio for output at the at least two transducers.

8. The system of claim 7, wherein the audio from the audio gateway comprises navigation instructions from a navigation application, wherein the spatialized audio comprises speech indicating the physical object within the environment, and wherein the controller is configured to interrupt the navigation instructions, pause the navigation instructions, or adjust volume of playback of the navigation instructions to provide the spatialized audio in response to detecting the physical object within the environment.

9. The system of claim 1, wherein the controller further identifies a location of the physical object within the environment, and wherein the spatialized audio output indicates a direction of the physical object relative to the body of the user, wherein the spatialized audio output indicates the direction of the physical object with a variation in at least one of a volume of audio output, a frequency of audio output, or a repeat rate of a sound in the audio output.

10. The system of claim 1, further comprising an additional object detection sensor coupled with the controller for detecting the physical object in the environment, wherein the additional object detection sensor comprises at least one of: a stereo optical sensor, an infrared sensor, a camera system, a light detection and ranging (LIDAR) system, a radio detection and ranging (RADAR) system, a global positioning system (GPS), or a set of microphones.

11. The system of claim 1, wherein the directional indication system comprises a haptic feedback device, and wherein initiating the directional output comprises initiating a haptic response at the haptic feedback device based on the identified physical object within the environment,
   wherein the haptic feedback device comprises a vibrotactile device, and wherein the haptic response indicates a direction of the physical object relative to the body of the user.

12. The system of claim 1, wherein at least one of the at least two receivers has a face that is at least partially angled relative to a movement direction of the user for detecting ground elevation.

13. The system of claim 1, wherein the controller is configured to initiate transmitting the ultrasonic signals into the environment with unique acoustic signatures.

14. The system of claim 1, further comprising an interface for receiving user commands, wherein the interface provides a plurality of user-selectable operating modes comprising at least one of:

a sweep mode configured to provide a spatialized directional representation of the environment proximate the user with a progressive sweep over a predetermined span of directional orientations; or a close object mode configured to provide a spatialized directional representation of physical objects located within a threshold distance from the user as detected by the return ultrasonic signals.

15. The system of claim 1, wherein the controller is configured to:

for each of the receivers, store only a first detection of a unique acoustic signature in the return ultrasonic signals; and record only detections of return ultrasonic signals that satisfy a volume threshold.

* * * * *